(12) United States Patent
Imanishi et al.

(10) Patent No.: US 8,227,123 B2
(45) Date of Patent: Jul. 24, 2012

(54) FUEL CELL SYSTEM AND CURRENT CONTROL METHOD WITH PI COMPENSATION BASED ON MINIMUM CELL VOLTAGE

(75) Inventors: Hiroyuki Imanishi, Toyota (JP); Kota Manabe, Toyota (JP); Tomoya Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 353 days.

(21) Appl. No.: 12/598,532

(22) PCT Filed: Jun. 27, 2008

(86) PCT No.: PCT/JP2008/062115
§ 371 (c)(1),
(2), (4) Date: Nov. 2, 2009

(87) PCT Pub. No.: WO2009/005136
PCT Pub. Date: Jan. 8, 2009

(65) Prior Publication Data
US 2010/0136451 A1 Jun. 3, 2010

(30) Foreign Application Priority Data
Jul. 2, 2007 (JP) .................................. 2007-174579

(51) Int. Cl.
*H01M 8/04* (2006.01)
(52) U.S. Cl. ......... 429/431; 429/428; 429/430; 429/432
(58) Field of Classification Search .................. 429/428, 429/430–432
See application file for complete search history.

(56) References Cited

U.S. PATENT DOCUMENTS

| 6,379,826 | B1 * | 4/2002 | Lacy .............................. 429/432 |
| 2004/0150405 | A1 * | 8/2004 | Burany et al. ................. 324/426 |
| 2006/0166044 | A1 | 7/2006 | Charlat |
| 2009/0197126 | A1 * | 8/2009 | Ganapathy et al. ............ 429/13 |
| 2009/0233132 | A1 * | 9/2009 | Hasuka et al. .................. 429/25 |

FOREIGN PATENT DOCUMENTS

| JP | 07-272736 A | 10/1995 |
| JP | 2001-210346 A | 8/2001 |
| JP | 2003-187842 A | 7/2003 |
| JP | 2003-282115 A | 10/2003 |
| JP | 2003-346849 A | 12/2003 |
| JP | 2006-156062 A | 6/2006 |
| WO | WO 2007/046192 A1 | 4/2007 |
| WO | WO 2007069472 A1 * | 6/2007 |

* cited by examiner

*Primary Examiner* — Basia Ridley
*Assistant Examiner* — Sean P Cullen
(74) *Attorney, Agent, or Firm* — Kenyon & Kenyon LLP

(57) ABSTRACT

A control unit 80, when calculating a request current I0 according to a system request electric power Preq and calculating a target current I1 by correcting the request current I0 with PI compensation calculation based on a minimum cell voltage Vm detected by a cell monitor 101, variably changes a proportional gain Kp according to the current value at the present time when calculating a current limit value ΔI as the amount of correction of a request current I0 according to the equation ΔI=ΔV×Kp+ΔΣV×Ki, thereby enhancing controllability to control the current of a fuel cell 20 to a target current value I1. When controlling the current of a fuel cell by determining a target current value by correcting a request current by PI compensation using the difference between a minimum cell voltage and a threshold voltage, controllability to control the current of the fuel cell to the target current value can be enhanced.

5 Claims, 4 Drawing Sheets

FUEL CELL SYSTEM AND CURRENT CONTROL METHOD WITH PI COMPENSATION BASED ON MINIMUM CELL VOLTAGE

CROSS-REFERENCES

This is a 371 national phase application of PCT/JP2008/062115 filed 27 Jun. 2008, which claims priority to Japanese Patent Application No. 2007-174579 filed 2 Jul. 2007, the contents of which are incorporated herein by reference.

BACKGROUND

The present invention relates to a fuel cell system provided with a fuel cell having a plurality of cells, and more particularly, to control of current when controlling electric power requested by the system.

A polymer electrolyte fuel cells is one example of a fuel cell that generates electricity by utilizing an electrochemical reaction between hydrogen and oxygen. This polymer electrolyte fuel cell is provided with a stack composed of a plurality of laminated cells. The cells that compose the stack are provided with an anode (fuel electrode) and a cathode (air electrode), and a solid polymer electrolyte membrane having ion exchange groups in the form of sulfonic acid groups is interposed between the anode and the cathode.

A fuel gas containing a fuel gas (reformed hydrogen obtained by reforming hydrogen gas or hydrocarbon to make it hydrogen-rich) is supplied to the anode, while a gas containing an oxidant in the form of oxygen (oxidant gas), for example air, is supplied to the cathode. As a result of the fuel gas being supplied to the anode, hydrogen contained in the fuel gas reacts with a catalyst of a catalyst layer composing the anode, and hydrogen ions are generated as a result thereof. The generated hydrogen ions pass through the solid polymer electrolyte membrane causing an electrical reaction with the oxygen. In this configuration, electricity is generated by this electrochemical reaction.

However, in the case of using a fuel cell as a motive power source for an automobile, although the fuel cell is required to be able to accommodate a wide range of usage conditions from low loads to high loads, if the fuel cell is operated under unsuitable conditions, the expected electrochemical reaction is unable to be obtained. For example, if there is a shortage of moisture contained in the polymer electrolyte membrane, the saturated vapor pressure thereof decreases particularly at low temperatures, thereby making it difficult to impart an adequate amount of required moisture to the supply gas.

Therefore, Japanese Patent Application Laid-open No. H7-272736, for example, proposes an invention in which a reaction temperature of a fuel cell is detected, a control table is referred to according to the reaction temperature, a threshold value of the allowable minimum voltage is selected, and when a monitor voltage of the fuel cell is lower than the threshold value, the amount of moisture contained in an electrolyte is determined to be insufficient and a current supplied to a load is interrupted.

On the other hand, in the case of using a fuel cell having a plurality of cells, if even one of the plurality of cells fails to generate electricity, the entire fuel cell may no longer generate electricity. Therefore, Japanese Patent Application Laid-open No. 2003-187842, for example, proposes an invention in which the voltage of each cell is measured, the amount of electric power able to be output by the fuel cell stack is calculated based on the minimum value among the measured cell voltages in the form of a minimum cell voltage, an amount of electric power equal to or less than the amount of electric power able to be output is generated in the fuel cell stack, and when the performance of any one of the cells has decreased, the fuel cell stack is operated in a suitable operating state corresponding thereto.

When the performance of any one of a plurality of cells has decreased, a request current is preferably corrected and controlled by proportional integration (PI), which uses the difference between the minimum cell voltage of a fuel cell stack and a threshold voltage, when operating the fuel cell stack in a suitable operating state corresponding thereto.

However, when correcting a request current in accordance with PI compensation, controllability may decrease if the gain of PI compensation becomes constant depending on the current at the present time.

SUMMARY

With the foregoing in view, an object of the present invention is to enhance controllability for making the current of a fuel cell equal to a target current value when controlling the current of a fuel cell by determining the target current by correcting a request current with PI compensation using the difference between a minimum cell voltage and a threshold voltage.

In order to solve the problems as described above, the fuel cell system of the present invention is a fuel cell system provided with a fuel cell having a plurality of cells, comprising: a current detection unit for detecting the current of the fuel cell; a voltage detection unit for detecting cell voltage in each of the cells; and a control calculation unit for PI-compensating a request current corresponding to a system request electric power requested by the system based on a minimum cell voltage detected by the cell voltage detection unit, wherein the control calculation unit changes a proportional gain for the PI compensation of the request current based on a present fuel cell current.

More specifically, the fuel cell system of the present invention comprises: a fuel cell having a plurality of cells; a cell monitor for detecting the cell voltage in each cell; and a control calculation unit for PI-compensating a request current corresponding to a system request electric power requested by the system based on a minimum cell voltage detected by the cell monitor.

The control calculation unit is provided with:
(1) minimum cell voltage deviation calculation means for calculating deviation between a prescribed minimum cell voltage reference value and the minimum cell voltage detected by the cell monitor;
(2) PI calculation means for calculating a current limit value based on the deviation between the minimum cell voltage reference value and the detected minimum cell voltage;
(3) request current calculation means for calculating a request current based on the system request electrical power;
(4) target current value calculation means for calculating a deviation between the request current and the current limit value as a target current value;
(5) electric power distribution calculation means for calculating the upper limit and lower limit of an electric power command value for the fuel cell based on the target current value; and
(6) current/voltage command value calculation means for calculating a current command value and a voltage command value defining an output current and output voltage of the fuel cell based on the upper limit and lower limit of the electric power command value.

In particular, in the case the detected minimum cell voltage is equal to or less than a prescribed threshold value, the control calculation unit changes the proportional gain for the PI compensation of the request current based on a present fuel cell current value.

In addition, the current control method for a fuel cell system of the present invention is a current control method for a fuel cell system provided with a fuel cell having a plurality of cells, the method comprising the steps of: detecting the cell voltage in each of the cells; PI-compensating a request current corresponding to a system request electric power requested by the system based on a minimum cell voltage; and changing a proportional gain for the PI compensation of the request current based on a present fuel cell current value.

According to this configuration, since the proportional gain for PI compensation of the request current is changed based on the current level of current (current detected at the present time) when detecting the minimum cell voltage in each cell and PI-compensating the request current corresponding to the system request electric power based on the minimum cell voltage during control of the amount of electricity generated by the fuel cell, the request current corresponding to the system request electric power can be variably adjusted based on the current at the present time, and as a result of being able to increase the proportional gain the greater the current level of current, controllability for controlling the current of the fuel cell to a target current value can be more greatly enhanced than when the proportional gain of PI compensation is constant.

The following elements can be added when configuring the fuel cell system described above.

For example, the control calculation unit preferably shuts off the system in the case where the minimum cell voltage detected by the minimum cell voltage detection unit is equal to or less than a prescribed allowable voltage.

According to this configuration, when the minimum cell voltage has become equal to less than a prescribed allowed voltage, and more specifically, equal to or less than a minimum voltage reference value (minimum voltage threshold value), a deviation between the minimum voltage reference value and the minimum cell voltage is integrated for a prescribed amount of time, and since the system is shut off when that integral value is equal to or less than a fixed value, the cell in which the minimum cell voltage has been recorded, and ultimately the entire system, can be protected. Preferably, when the difference between the prescribed minimum cell voltage threshold value Vth and the minimum cell voltage Vm is defined as $\Delta V$, the proportional gain is defined as Kp, and the integrated gain is defined as Ki, then the control calculation unit calculates the amount of correction of the request current $\Delta I$ according to $Kp \times \Delta V + Ki \times \Sigma \Delta V$.

According to this configuration, by varying the proportional gain Kp according to the present level of current, the amount of current of the fuel cell can be controlled so that the minimum cell voltage does not become equal to or less than the minimum cell voltage reference value (minimum cell voltage threshold value) when determining a request IP-compensated on the basis of the minimum cell voltage.

According to the present invention, controllability for controlling the current of the fuel cell to a target current value can be more greatly enhanced than when the proportional gain of PI compensation is constant.

DETAILED DESCRIPTION

Figure 1:
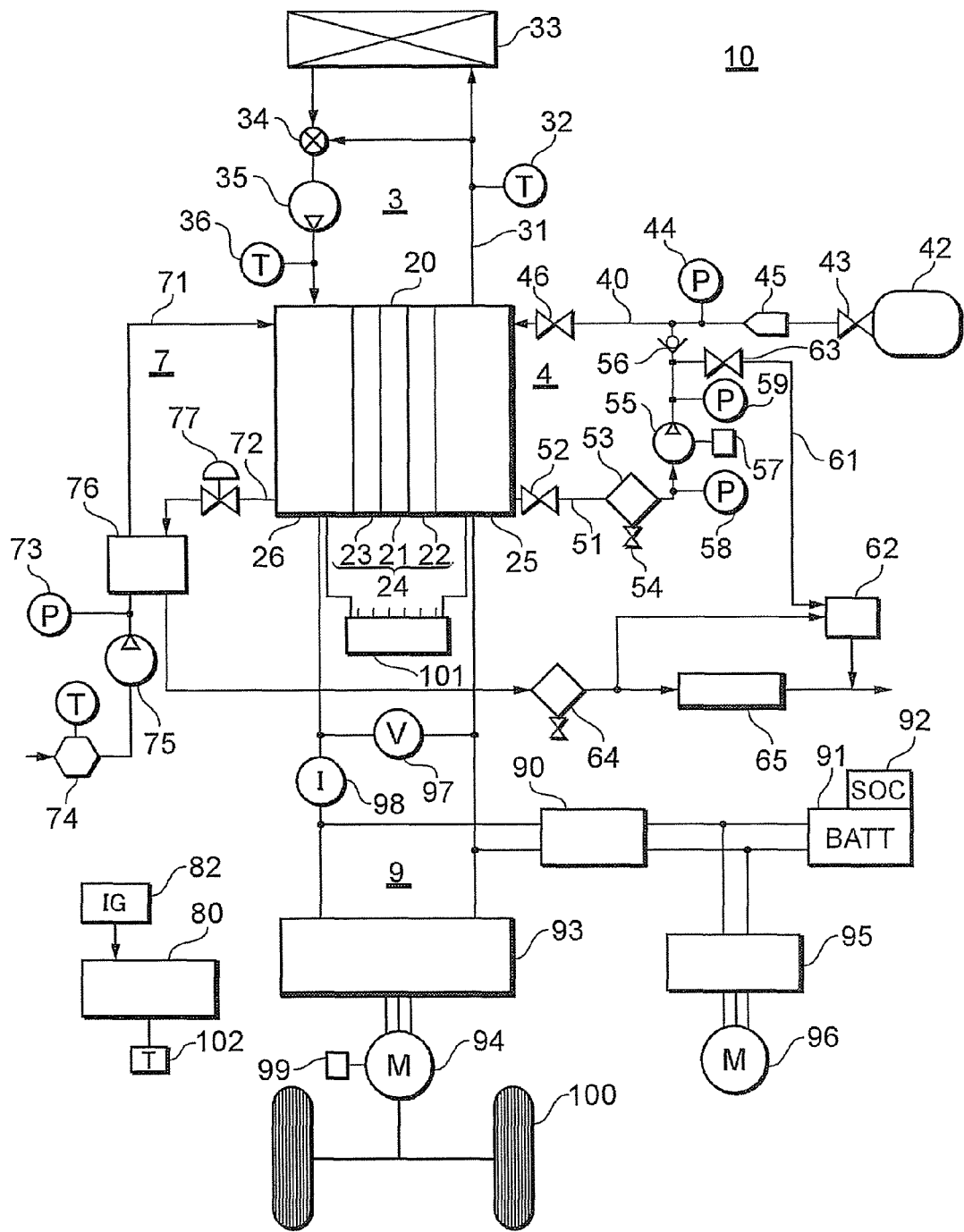
FIG. 1 is a system block diagram of a fuel cell system as claimed in the present invention.

FIG. 1 is a system block diagram of a fuel cell system to which the present invention is applied.

In FIG. 1, a fuel cell system 10 is composed by being provided with a fuel gas supply system 4 for supplying fuel gas (hydrogen gas) to a fuel cell 20, an oxidizing gas supply system 7 for supplying oxidizing gas (air) to the fuel cell 20, a coolant supply system 3 for cooling the fuel cell 20, and an electric power system 9 for charging and discharging generated electric power from the fuel cell 20.

The fuel cell 20 is provided with a membrane electrolyte assembly (MEA) 24 in which an anode electrode 22 and a cathode electrode 23 are formed by screen printing and the like on both sides of a polymer electrolyte membrane 21 composed of a proton-conducting ion exchange membrane formed from a fluorine-based resin and the like. Both sides of the membrane electrolyte assembly 24 are sandwiched by a separator (not shown in the figure) having fuel gas, oxidizing gas and cooling water flow paths, and a groove-shaped anode gas channel 25 and cathode gas channel 26 are respectively formed between this separator and the anode electrode 22 and the cathode electrode 23. The anode electrode 22 is composed by providing a fuel electrode catalyst layer on a porous support layer, while the cathode electrode 23 is composed by providing an air electrode catalyst layer on a porous support layer. The catalyst layers of these electrodes are composed by, for example, adhering platinum particles.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

Furthermore, in FIG. 1, in order to expedite the explanation, although the structure of a unit cell composed of the membrane electrolyte assembly 24, the anode gas channel 25 and the cathode gas channel 26 is shown schematically, in actuality, a stack structure is provided in which a plurality of unit cells (cell group) are connected in series with the above-mentioned separator interposed there between.

The coolant supply system 3 of the fuel cell system 10 is provided with a cooling path 31 that circulates a coolant, a temperature sensor 32 that detects the temperature of the coolant discharged from the fuel cell 20, a radiator (heat exchanger) 33 that releases heat of the coolant to the outside, a valve 34 that regulates the amount of coolant entering the radiator 33, a coolant pump 35 that circulates the coolant by pressurizing, and a temperature sensor 36 that detects the temperature of coolant supplied to the fuel cell 20.

A fuel gas supply apparatus 42 for storing a fuel gas (anode gas) such as hydrogen gas, a fuel gas flow path 40 for supplying fuel gas from the fuel gas supply apparatus 42 to the anode gas channel 25, and a circulation flow path (circulation route) 51 for circulating fuel off gas discharged from the anode gas channel 25 to the fuel gas flow path 40, are connected to the fuel gas supply system 4 of the fuel cell system 10, and a fuel gas circulation system is composed by these gas flow paths.

The fuel gas supply apparatus 42 is composed of, for example, a high-pressure hydrogen tank, a hydrogen storage alloy, a reformer and the like. A cutoff valve (stop valve) 43 for controlling the outflow of fuel gas from the fuel gas supply apparatus 42, a pressure sensor 44 for detecting the pressure of the fuel gas, a control valve (ejector) 45 for regulating the fuel gas pressure of the circulation route 51, and a shutoff valve 46 for controlling the supply of fuel gas to the fuel cell 20, are installed in the fuel gas flow path 40.

A shutoff valve 52 for controlling the supply of off gas from the fuel cell 20 to the circulation route 51, a gas-liquid separator 53 and a discharge valve 54 for removing moisture contained in the fuel off gas, a hydrogen pump (circulation pump) 55 for circulating fuel off gas subjected to pressure loss during passage through the anode gas channel 25 to the fuel gas flow path 40 after compressing the fuel off gas and increasing the pressure thereof to a suitable gas pressure, and a non-return check valve 56 for preventing backflow of fuel gas in the fuel gas flow path 40 to the circulation flow path 51, are installed in the circulation flow path 51. As a result of driving the hydrogen pump 55 with a motor, fuel off gas resulting from driving the hydrogen pump 55 merges with fuel gas supplied from the fuel gas supply apparatus 42 in the fuel gas flow path 40 followed by being supplied to the fuel cell 20 for reuse. Furthermore, a rotating speed sensor 57 for detecting the rotating speed of the hydrogen pump 55, and pressure sensors 58 and 59 for detecting circulation route pressure before and after the hydrogen pump 55, are installed in the hydrogen pump 55.

In addition, an exhaust flow path 61 for discharging fuel off gas discharged from the fuel cell 20 outside a vehicle through a diluter (such as a hydrogen concentration reduction apparatus) 62 is connected after branching to the circulation flow path 51. A purge valve 63 is installed in the exhaust flow path 61, and is composed so as to be able to control the discharge of fuel off gas. By opening and closing the purge valve 63, circulation within the fuel cell 20 repeatedly discharges fuel off gas in which the concentration of impurities has increased to the outside and introduces fresh fuel gas, thereby making it possible to prevent decreases in cell pressure. In addition, moisture that has accumulated in the gas flow path can also be removed by generating pulsations in the internal pressure of the circulation flow path 51.

On the other hand, an oxidizing gas flow path 71 for supplying oxidizing gas (cathode gas) to the cathode gas channel 26, and a cathode off gas flow path 72 for discharging cathode off gas discharged from the cathode gas channel 26, are connected to the oxidizing gas supply system 7 of the fuel cell system 10. An air cleaner 74 that takes in air from the atmosphere, and an air compressor 75 for compressing the incorporated air and sending the compressed air to the cathode gas channel 26 in the form of oxidant gas, are installed in the oxidizing gas flow path 71, and an air pressure sensor 73 for detecting the air supply pressure of the air compressor 75 is installed in the air compressor 75. A humidifier 76 is provided for carrying out humidity exchange between the oxidizing gas flow path 71 and the cathode off gas flow path 72. A control valve 77 for regulating the exhaust pressure of the cathode off gas flow path 72, a gas-liquid separator 64 for removing moisture in the cathode off gas, and a muffler 65 for absorbing the exhaust sound of the cathode off gas, are provided in the cathode off gas flow path 72. Cathode off gas discharged from the gas-liquid separator 64 is branched, with one of the portions flowing into the diluter 62 where it is mixed and diluted with fuel off gas retained in the diluter 62, while the other portion of the cathode off gas is muffled with the muffler 65 after which it is mixed with the gas mixed and diluted by the diluter 62 and then discharged outside the vehicle.

In addition, a DC-DC converter 90, to the primary side of which is connected an output terminal of a battery 91 and to the secondary side of which is connected an output terminal of the fuel cell 20, a battery 91 that accumulates surplus electric power in the form of a secondary battery, a battery computer 92 that monitors the charged status of the battery 91, an inverter 93 that supplies alternating current electric power to a load of the fuel cell 20 or to a motor 94 for operating the vehicle to be driven, an inverter 95 that supplies alternating current electric power to various types of high-voltage accessories 96 of the fuel cell system 10, a voltage sensor 97 that measures output voltage of the fuel cell 20, and a current sensor 98 that measures output current of the fuel cell 20, are connected to the electric power system 9 of the fuel cell system 10.

Moreover, a cell monitor 101 that detects the voltage in each cell of the fuel cell 20 is connected to the fuel cell 20. The cell monitor 101 also detects the minimum voltage of a cell, and functions as the minimum cell voltage detection unit of the present invention.

The DC-DC converter 90 charges the battery 91 by converting surplus electric power of the fuel cell 20 or regenerated electric power generated by braking operation of the vehicle operating motor 94 to a voltage and supplying to the battery 91. In addition, in order to replenish a shortage of generated electric power of the fuel cell 20 with respect to request electric power by the vehicle operating motor 94, the DC-DC converter 90 outputs discharged electric power from the battery 91 to the secondary side after converting to a voltage.

The inverters 93 and 95 respectively output direct current current to the vehicle operating motor 94 and the high-voltage accessories 96 after converting a direct current to a three-phase alternating current current. A rotating speed sensor 99 for detecting the rotating speed of the vehicle operating motor 94 is installed in the vehicle operating motor 94. Wheels 100 are mechanically coupled to the motor 94 via a differential, enabling the rotational force of the motor 94 to be converted to propulsion force of the vehicle.

A voltage sensor 97 and a current sensor 98 are for measuring alternating current impedance based on current phase and amplitude with respect to the voltage of an alternating current superimposed on the electric power system 9. Alternating current impedance corresponds to the amount of moisture of the fuel cell 20.

Moreover, a control unit 80 for controlling electric power generation by the fuel cell 20 is installed in the fuel cell system 10. The control unit 80 is composed with, for example, a general-purpose computer provided with a central processing unit (CPU), RAM, ROM, interface circuit and the like, incorporates sensor signals from the temperature sensors 32 and 36, the pressure sensors 44, 58 and 59 and the rotating speed sensors 57, 73 and 99, as well as signals from the voltage sensor 97, the current sensor 98 and an ignition switch 82, and regulates the rotating speed of the hydrogen pump 55 and the air compressor 75 by driving each motor corresponding to an electric power load or other elements of fuel cell operating status, while also controlling the opening and closing of each type of valves or adjusting valve opening and the like.

In the present embodiment in particular, the control unit 80 is provided with the function of a control calculation unit that calculates a vehicle system request power (request power requested by the system) Preq based on vehicle accessory power loss, battery charge level and the power limit rate of the high-voltage accessories 96 when controlling the output electric power of the fuel cell system 10 (in the state in which the operating motor 94 is not operating), calculates a vehicle system request current by taking into consideration a current lower limit value determined from the minimum cell voltage detected by the cell monitor 101 with respect to the system request power Preq, calculates command values in the form of a current value and a voltage value for the DC-DC converter 90 based on the vehicle system request current obtained from this calculation, and then controls driving of the DC-DC converter 90 in accordance with that calculation result.

Figure 2:
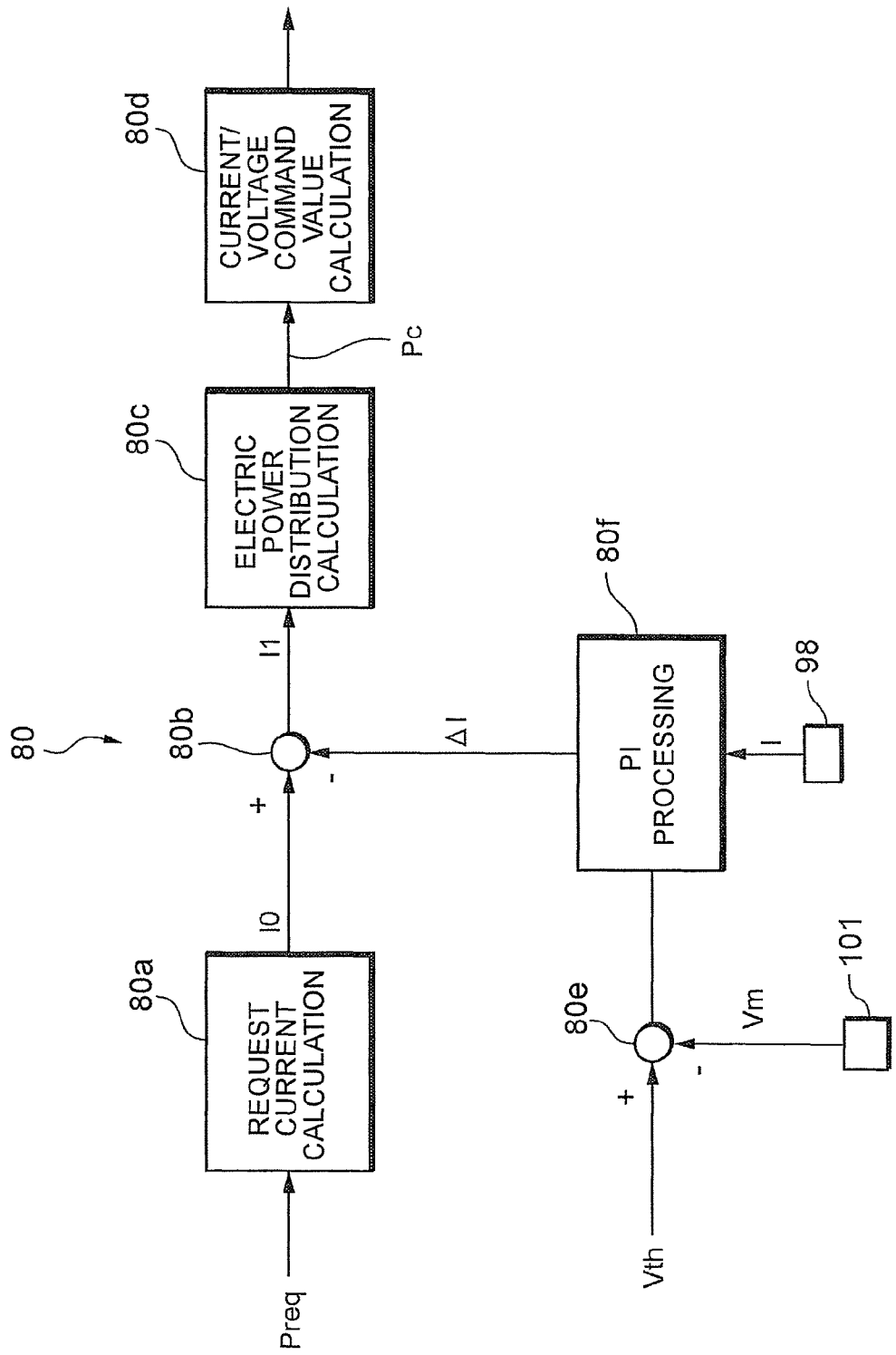
FIG. 2 is a block diagram of a control unit.

FIG. 2 shows a function block diagram of the present embodiment realized by the control unit 80 executing a prescribed computer program.

As shown in FIG. 2, the control unit 80 is composed in the form of a control calculation unit provided with a request current calculation unit 80a, a first subtractor 80b, an electric power distribution calculation unit 80c, a current/voltage command value calculation unit 80d, a second subtractor 80e and a PI calculation unit 80f.

The request current calculation unit 80a calculates a request current (current requested by a vehicle system) I0 based on the system request electric power Preq, and outputs the calculated request current I0 to the first subtractor 80b. The second subtractor 80e calculates a deviation ΔV=Vth−Vm between a minimum cell voltage reference value in the form the threshold value Vth and the minimum cell voltage Vm detected by the cell monitor 101, and outputs the calculated deviation ΔV to the PI calculation unit 80f.

Figure 3:
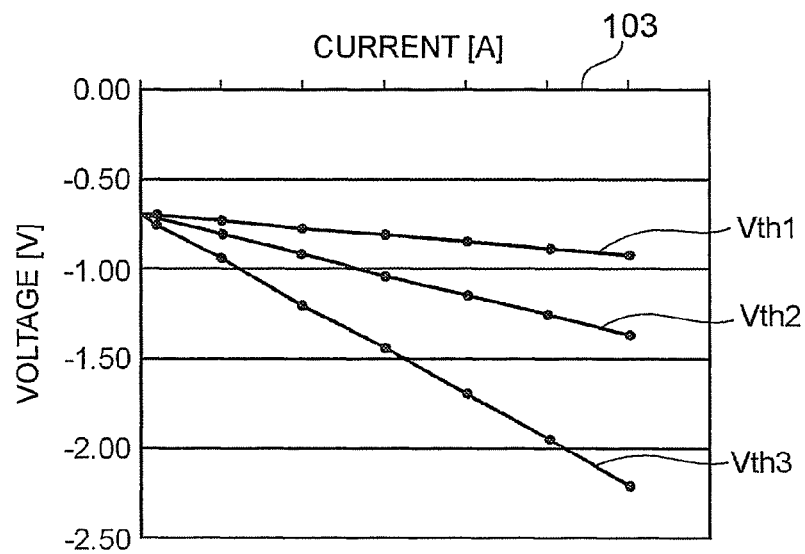
FIG. 3 is a characteristics diagram of minimum cell voltage reference value map.

FIG. 3 shows the characteristics of the minimum cell voltage reference value corresponding to temperature.

The minimum cell voltage reference value refers to a reverse voltage able to be allowed as the cell voltage at low temperatures in order to protect the fuel cell, and is calculated from the reverse potential during depletion of hydrogen gas and the amount of reduction in cathode potential attributable to a resistance value. The control unit 80 preliminarily stores in memory minimum cell voltage reference value characteristics as shown in FIG. 3 in the form of a minimum cell voltage reference value map 103.

The second subtractor 80e refers to the map of the minimum cell voltage reference value characteristics in the form of the threshold value Vth. When the second subtractor 80e has calculated the deviation ΔV, it searches the minimum cell voltage reference value map 103 stored in memory of the control unit 80 as shown in FIG. 3 based on the current detected by the current sensor (current detection unit) 98 and the temperature detected by the temperature sensor 32 detecting the internal temperature of the fuel cell 20 or the temperature sensor 102 detecting the environmental temperature of the system, and then selects a threshold value Vth that indicates a minimum cell voltage reference value corresponding to the detected temperature. Namely, since the threshold value Vth is dependent on temperature and current, a search is made of the minimum cell voltage reference value map 103 in accordance with detected temperature and detected current. In FIG. 3, the threshold values Vth1, Vth2 and Vth3 respectively indicate minimum cell voltage reference values at temperatures of 0° C., −20° C. and −30° C., the each minimum cell voltage reference value is characterized by a straight line having a gentler slope the higher the temperature.

The PI calculation unit 80f calculates a current limit value ΔI relative to the request current I0 in accordance with the following equation (4) based on the deviation ΔV calculated by the second subtractor 80e.

Current limit value ΔI=minimum cell voltage deviation ΔV×proportional gain Kp+minimum cell voltage integral value ΣΔV×integrated gain Ki (4)

The PI calculation unit 80f calculates the current limit value ΔI as the amount of correction of the request current I0, and outputs this calculated value to the first subtractor 80b. The first subtractor 80b then calculates the current target current value I1 from the deviation between the request current I0 and the current limit value ΔI, and outputs the calculated target current value I1 to the electric power distribution calculation unit 80c.

Here, in the case the minimum cell voltage Vm has become equal to or less than the threshold value Vth when the target current value I1 has been calculated by correcting the request current I0 in accordance with the current limit value ΔI, the PI calculation unit 80f and the first subtractor 80b prohibit current limitation, or in other words, calculate the target current value I1 without compensating the request current according to the current limit value ΔI.

Figure 4:
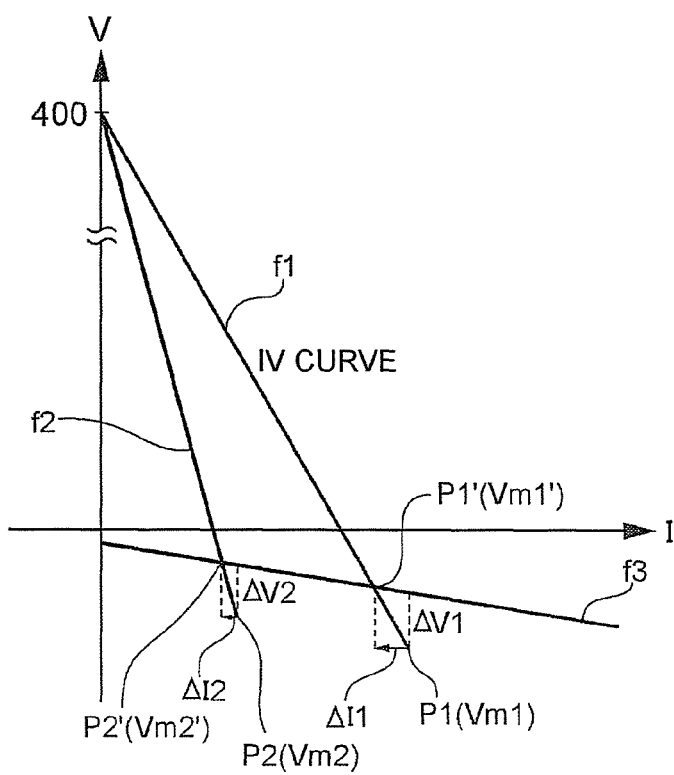
FIG. 4 is an IV characteristics diagram for determining a current limit value and a minimum cell voltage deviation.

FIG. 4 indicates the relationship between IV characteristics and minimum cell voltage reference value characteristics during low efficiency operation.

As shown in FIG. 4, when the operating point at −20° C. under certain conditions was P1 and the minimum cell voltage was Vm1, for example, the IV characteristics of the cell obtained from the cell monitor 101 are represented by line f1. In addition, when the operating point at −20° C. was P2 and the minimum cell voltage was Vm2 under different conditions, the IV characteristics of the cell obtained from the cell monitor 101 are represented by line f2. For example, if the minimum cell voltage reference value characteristics at a prescribed temperature are represented by line f3, then the intersection of line f1 and line f3 becomes P1', and the intersection of line f2 and line f3 becomes P2'. In this case, in order to continue to generate electrical power by the fuel cell 20, it is necessary for the operating point P1, indicating a minimum cell voltage Vm1 lower than the threshold value Vth2, to move to the operating point P1', and for the operating point P2, indicating a minimum cell voltage Vm2 lower than the threshold value Vth2, to move to the operating point P2'.

Although a calculation is carried out based on a proportional component P and an integrated component I of the IV characteristics in the PI calculation unit 80f in order to move the operating points, in the present embodiment, only the IV characteristics of the proportional component P are shown in FIG. 4, while the integrated component I is omitted to simplify the explanation.

Here, when considering only the proportional component P, the minimum cell voltage deviations between the operating points P1 and P2 are ΔV1=f3(VP1)−Vm1 and ΔV2=f3(VP2)−Vm2, respectively. Here, the voltage VP1 represents the cell voltage at the operating point P1, while the voltage VP2 represents the cell voltage at the operating point P2.

On the other hand, the current limit values ΔI to be determined in order to move the operating points P1 and P2 to the operating points P1' and P2', respectively, are ΔI1 and ΔI2. These are calculated using equations (5) and (6) below.

ΔI1=Kp×ΔV1+Ki×ΣΔV1 (5)

ΔI2=Kp×ΔV2+Ki×ΣΔV2 (6)

Here, when line f1 is compared with line f2, the slope of each line f1 and f2 in the form of the proportional gain Kp can be seen to change with the magnitude of the current value. Namely, ΔI2 is better than ΔI1 as a value of ΔI because it is smaller.

Therefore, the present embodiment is configured so that the proportional gain Kp is variably changed according to the current value detected by the current sensor 98 when determining the current limit value ΔI. For example, the value of the proportional gain Kp becomes larger as the current value increases.

The electric power distribution calculation unit 80c calculates the upper and lower limits of the output command values for the fuel cell 20 based on the current target current value I1 obtained by going through the processing described above, and outputs the calculation result Pc to the current/voltage command value calculation unit 80d. The upper and lower limits of the electric power command values prevent exacerbation of output accuracy caused by the occurrence of charging and discharging by stack capacity components and the like, as well as the occurrence of hunching of system request power caused by fluctuations in the amount of air supplied.

The current/voltage command value calculation unit 80d outputs the current command value and the voltage command value to the DC-DC converter 90 based on the calculation results of the electric power distribution calculation unit 80c. This current command value and voltage command value are control signals defining the actual output current and output voltage in the fuel cell 20.

Figure 5:
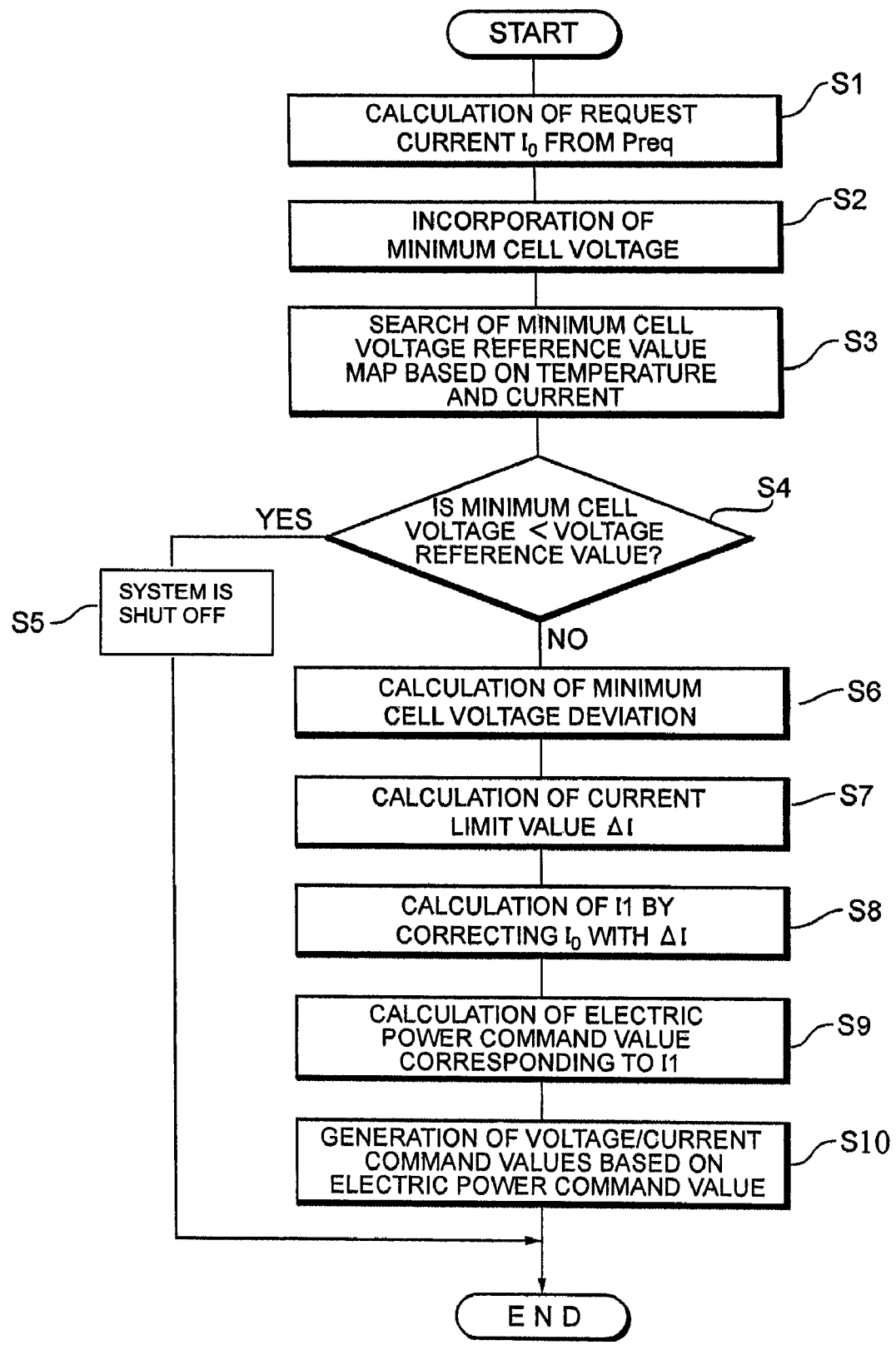
FIG. 5 is a flow chart for explaining processing by a control unit.

Next, an explanation is provided of the processing contents of the control unit 80 in accordance with the flow chart of FIG. 5.

First, the request current calculation unit 80a of the control unit 80 calculates the request current I0 for the fuel cell 20 from the system request electric power Preq when controlling the output electric power of the fuel cell system 10 (S1). Next, the first subtractor 80b of the control unit 80 incorporates the minimum cell voltage Vm detected by the cell monitor 101 (S2). Next, the second subtractor 80b detects the temperature and output current of the fuel cell 20, refers to the minimum cell voltage reference value map 103 corresponding to the detected temperature, and reads a minimum cell voltage reference value corresponding to the detected temperature (S3). The first subtractor 80b then determines whether or not the minimum cell voltage Vm is lower than the minimum cell voltage reference value (S4).

When the minimum cell voltage Vm is determined to be lower than the minimum cell voltage reference value as a result of that determination (Yes), then the system is shut off (S5) and processing ends at this step.

On the other hand, when the minimum cell voltage Vm is found to be larger than the minimum cell voltage reference value (No), the second subtractor 80e of the control unit 80 calculates the deviation ΔV between the threshold value (minimum cell voltage reference value) Vth obtained from the minimum cell voltage reference value map 103 and the detected cell voltage Vm (S6). Next, the PI calculation unit 80f of the control unit 80 calculates the current limit value ΔI in the form of the amount of correction of the request current I0 from the calculated deviation ΔV according to equation (4) (S7). At this time, the current limit value ΔI is calculated by carrying out PI calculation while variably changing the proportional gain Kp corresponding to the current value at the present time (such as the current detected by the current sensor 98).

Next, the first subtractor 80b of the control unit 80 determines the deviation between the request current I0 and the current limit value ΔI, and outputs this deviation in order to obtain the current target current value I1 (S8). Next, the electric power distribution calculation unit 80c of the control unit 80 calculates the upper and lower limits of the electric power command values in accordance with the target current value I1 obtained by correcting the request current I0 with the current limit value ΔI (S9). The current/voltage command value calculation unit 80d of the control unit 80 then outputs the voltage command value and the current command value in the form of drive signals for controlling the DC-DC converter 90 based on the calculated electric power command values (S10). Namely, the amount of electrical power generated and the output electric power of the fuel cell 20 are controlled according to the target current value I1 so that the cell voltage Vm does not become equal to or less than the threshold value (minimum cell voltage reference value) Vth, and processing ends with this step.

According to the present embodiment as has been described above, when calculating the request current I0 according to the system request electric power Preq and calculating the target current I1 by correcting the request current I0 with PI compensation calculation based on the cell voltage Vm detected by the cell monitor 101, since the proportional gain Kp is variably changed according to the current value at the present time when calculating the current limit value ΔI as the amount of correction of the request current I0 according to the equation $\Delta I = \Delta V \times K_p + \Sigma \Delta V \times K_i$, controllability for controlling the current of the fuel cell 20 to the target current value I1 can be enhanced.

In addition, when shutting off the system, the minimum cell voltage deviation ΔV between the cell voltage Vm and the threshold value (minimum cell voltage reference value) Vth is integrated for a prescribed amount of time, and the system can be shut off when the integral value of the minimum cell voltage deviation ΔV has become smaller than the product of determination time×integration time.

In this case, if a specific voltage is tentatively 0.5 V and the integration time is 1 second, since continuation of system operation is allowed if a minimum cell voltage deviation ΔV of 0.1 V is continued for 5 seconds, continuation for a fixed period of time or longer is conditioned on minimum cell voltage deviation ΔV=minimum cell voltage reference value Vth−minimum cell voltage Vm being positive.

According to the present invention, controllability for making the current of a fuel cell equal to a target current value can be enhanced to a greater extent than when the proportional gain of PI compensation is constant.

The present invention can be applied to a typical fuel cell system provided with a fuel cell that generates electrical energy by an electrochemical reaction between a fuel gas (such as hydrogen) and an oxidizing gas (such as air), and is particularly preferable for a fuel cell system having a defined minimum cell voltage.

We claim:

1. A fuel cell system provided with a fuel cell having a plurality of cells, comprising:
    a cell voltage detection unit for detecting a cell voltage in each of the cells; and
    a control calculation unit programmed to PI-compensate, based on a minimum cell voltage detected by the cell voltage detection unit, a request current corresponding to a system request electric power requested by the system, wherein
    the control calculation unit is programmed to change a proportional gain for the PI compensation of the request current based on a present fuel cell current value.

2. The fuel cell system according to claim 1, wherein the control calculation unit is programmed to shut off the system in a case where the minimum cell voltage detected by the cell voltage detection unit is equal to or less than a prescribed allowable voltage.

3. The fuel cell system according to claim 1, wherein when a difference between a prescribed minimum cell voltage threshold value Vth and the minimum cell voltage Vm is defined as ΔV, the proportional gain is defined as Kp, and an integrated gain is defined as Ki, the control calculation unit is programmed to calculate an amount of correction ΔI of the request current according to Kp×ΔV+Ki×ΣΔV.

4. A fuel cell system comprising: a fuel cell having a plurality of cells; a cell monitor for detecting a cell voltage in each of the cells; and a control calculation unit programmed to PI-compensate a request current corresponding to a system request electric power requested by the system based on a minimum cell voltage detected by the cell monitor, wherein the control calculation unit is provided with:
- a minimum cell voltage deviation calculation device that calculates a deviation between a prescribed minimum cell voltage reference value and the minimum cell voltage detected by the cell monitor;
- a PI calculation device that calculates a current limit value based on the deviation between the prescribed minimum cell voltage reference value and the detected minimum cell voltage;
- a request current calculation device that calculates the request current based on the system request electrical power;
- a target current value calculation device that calculates a target current value as a deviation between the request current and the current limit value;
- an electric power distribution calculation device that, based upon the target current value, calculates an upper limit and a lower limit of an electric power command value for the fuel cell; and
- a current/voltage command value calculation device that calculates a current command value and a voltage command value defining an output current and output voltage of the fuel cell based on the upper limit and lower limit of the electric power command value, and wherein
the control calculation unit changes a proportional gain for the PI compensation of the request current based on a present fuel cell current value in a case where the detected minimum cell voltage is greater than the prescribed minimum cell voltage reference value.

5. A current control method for a fuel cell system provided with a fuel cell having a plurality of cells, the method comprising:
   detecting a cell voltage in each of the cells;
   PI-compensating, based on a minimum cell voltage, a request current corresponding to a system request electric power requested by the system; and
   changing, based on a current fuel cell current value, a proportional gain for the PI compensation of the request current.

* * * * *

UNITED STATES PATENT AND TRADEMARK OFFICE
CERTIFICATE OF CORRECTION

PATENT NO. : 8,227,123 B2
APPLICATION NO. : 12/598532
DATED : July 24, 2012
INVENTOR(S) : Hiroyuki Imanishi et al.

Page 1 of 1

It is certified that error appears in the above-identified patent and that said Letters Patent is hereby corrected as shown below:

In the Claims:

Column 11, Line 1, change "AV" to --$\Delta$V--

Signed and Sealed this
Fourteenth Day of May, 2013

Teresa Stanek Rea
*Acting Director of the United States Patent and Trademark Office*